N. J. HOLMES.
Compositions for Marine Signal-Lights.
No. 134,058.                          Patented Dec. 17, 1872.
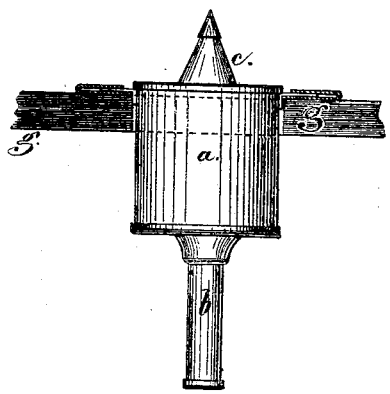
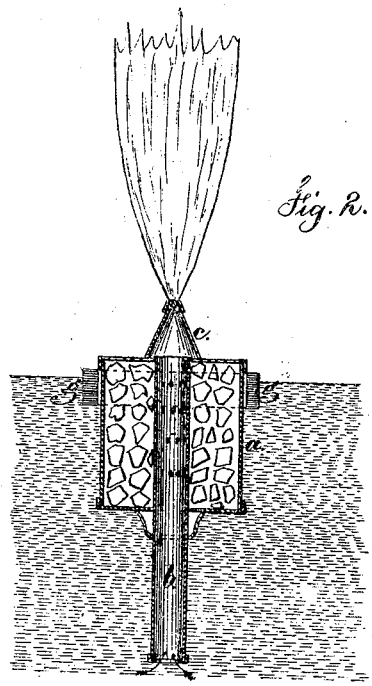
Witnesses
Chas H Smith
Geo. D. Walker
Inventor
Nathaniel J. Holmes
Lemuel W. Serrell
atty.

UNITED STATES PATENT OFFICE.

N. JOHN HOLMES, OF LONDON, ENGLAND.

IMPROVEMENT IN COMPOSITIONS FOR MARINE-SIGNAL LIGHTS.

Specification forming part of Letters Patent No. 134,058, dated December 17, 1872.

*To all whom it may concern:*

Be it known that I, NATHANIEL JOHN HOLMES, of London, England, have invented Improved Signal-Lights for marine and other purposes, of which the following is a specification:

This invention is based upon Letters Patent No. 301, granted to me in Great Britain and sealed July 22, 1870; but the following description relates to improvements made by me upon the invention of Ferdinand Silas.

This signal is not affected injuriously by heat, and cannot be ignited except by the contact of water with the ingredients contained in the air-tight case; hence the signal is perfectly harmless, and is ready for instant use by simply perforating the case sufficiently to allow water to pass in and the gas to pass out.

The light cannot be extinguished by either wind or water, and hence is of great value as a signal in storms to show the position of a vessel in distress or of a buoy.

In case of a man falling overboard, one of these signals thrown overboard after puncturing the ends gives a light both to the person in the water and marks the spot for the life-boat to be rowed to.

In times of wreck the signal may be thrown with the life-line to indicate its position or to illuminate the wreck.

For army and navy purposes this signal may be used to advantage in any preconcerted manner, and it cannot be extinguished while in contact with water.

In the drawing, Figure 1 is an external view of said signal apparatus, and Fig. 2 is a vertical section of the same.

I employ a case, *a*, of suitable size, about three inches in diameter and four inches high. Through the center passes a tube, *b*, having lateral openings into the case. At the top is a nozzle, *c*, preferably tapering, with one or more openings, and over the end a soft-metal cap is soldered air-tight. The lower end of the tube *b* is also closed tightly by a soft-metal cap. A float, *g*, is generally preferable for keeping the signal upright.

During the process of manufacture the case is filled with phosphide of calcium in small lumps. The phosphide can be obtained by heating lumps of chalk in a crucible containing a certain proportion of phosphorus, which, being converted into vapor, is absorbed by the chalk when at a white heat.

To prepare the signal for use the soft-metal ends are punctured or cut off, and as soon as the water enters the tube *b* and comes in contact with the phosphide of calcium the phosphoreted-hydrogen gas evolved passes off and inflames spontaneously, and cannot be extinguished either by wind or water.

I claim as my invention—

The signal made in the form of a portable case, containing phosphide of calcium and sealed air-tight, substantially as set forth.

Signed by me this 9th day of July, A. D. 1872.

NATH. J. HOLMES.

Witnesses:
 JOHN C. TULLER, *London.*
 BASIL G. HOLMES, *London.*